(12) United States Patent
Lavoie et al.

(10) Patent No.: US 8,761,604 B2
(45) Date of Patent: Jun. 24, 2014

(54) SMALL FORM FACTOR PLUGGABLE UNIT WITH SIGNAL CONVERSION CAPABILITIES

(76) Inventors: Renaud Lavoie, Laval (CA); Eric Dudemaine, Crabtree (CA)

( * ) Notice: Subject to any disclaimer, the term of this patent is extended or adjusted under 35 U.S.C. 154(b) by 0 days.

(21) Appl. No.: 13/082,628

(22) Filed: Apr. 8, 2011

(65) Prior Publication Data

US 2012/0257103 A1 Oct. 11, 2012

(51) Int. Cl.
*H04B 10/00* (2013.01)
*H04B 10/40* (2013.01)

(52) U.S. Cl.
CPC .................................. *H04B 10/40* (2013.01)
USPC ............................................ 398/135; 398/138

(58) Field of Classification Search
CPC ............................................ H04B 10/40
USPC .............................. 725/121; 398/58, 135, 138
See application file for complete search history.

(56) References Cited

U.S. PATENT DOCUMENTS

| | | | |
|---|---|---|---|
| 6,433,906 B1 * | 8/2002 | Farhan | 398/167.5 |
| 6,667,994 B1 * | 12/2003 | Farhan | 370/535 |
| 7,222,358 B2 * | 5/2007 | Levinson et al. | 725/121 |
| 7,978,541 B2 * | 7/2011 | Sutardja | 365/189.16 |
| 2005/0281193 A1 * | 12/2005 | Hofmeister et al. | 370/217 |
| 2007/0104227 A1 * | 5/2007 | Rivera | 370/493 |
| 2007/0286207 A1 * | 12/2007 | Almalki et al. | 370/395.52 |
| 2008/0050074 A1 * | 2/2008 | Dallesasse et al. | 385/92 |
| 2008/0062328 A1 * | 3/2008 | Bilbrey | 348/705 |
| 2008/0267620 A1 * | 10/2008 | Cole et al. | 398/17 |
| 2009/0154924 A1 * | 6/2009 | Liu et al. | 398/58 |
| 2009/0214221 A1 * | 8/2009 | Li et al. | 398/136 |
| 2011/0002690 A1 * | 1/2011 | Anschutz | 398/67 |
| 2011/0135312 A1 * | 6/2011 | El-Ahmadi et al. | 398/135 |
| 2011/0170577 A1 * | 7/2011 | Anvari | 375/219 |

* cited by examiner

*Primary Examiner* — Ernest Unelus

(57) ABSTRACT

The present disclosure relates to devices comprising small form factor pluggable units (SFP) having connectors for receiving and sending signals and a processor for converting the received signals prior to sending the converted signals. Received or sent signals may comprise video signals in various analog or digital formats. Conversion of the received signals may comprise analog to digital or digital to analog conversion, serializing or deserializing a digital signal, frame synchronization of a video signal, and/or cross conversion of a video signal from a first format to a second format.

16 Claims, 11 Drawing Sheets

SMALL FORM FACTOR PLUGGABLE UNIT WITH SIGNAL CONVERSION CAPABILITIES

TECHNICAL FIELD

The present disclosure relates to the field of small form factor pluggable units. More specifically, the present disclosure relates to a device for converting video signals.

BACKGROUND

Small Form-factor Pluggable (SFP) units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, and various other types of electrical connectors. In general, a SFP unit allows connection between an external apparatus, via a front connector of one of the aforementioned types, and internal components of a host system, for example a motherboard or a backplane leading to further components, via a back interface of the SFP unit. Specification no INF-8074i Rev 1.0, entitled "SFP (Small Form factor Pluggable) Transceiver", dated May 12, 2001, available at ftp://ftp.seagate.com/sff/INF-8074.PDF, generally describes sizes, mechanical interfaces, electrical interfaces and identification of SFP units.

The SFF Committee also produced specification no SFF-8431 Rev. 4.1, "Enhanced Small Form Factor Pluggable Module SFP+", dated Jul. 6, 2010. This document, which reflects an evolution of the INF-8074i specification, defines, inter alia, high speed electrical interface specifications for 10 Gigabit per second SFP+ modules and hosts, and testing procedures. The term "SFP+" designates an evolution of SFP specifications.

INF-8074i and SFF-8431 do not generally address internal features and functions of SFP devices. In terms of internal features, they simply define identification information to describe SFP devices' capabilities, supported interfaces, manufacturer, and the like. As a result, conventional SFP devices merely provide connection means between external apparatuses and components of a host system, the host system in turn exchanging signals with external apparatuses via SFP devices.

SUMMARY

According to a first aspect, the present disclosure provides a small form-factor pluggable (SFP) unit comprising a first connector for receiving a video signal, an analog to digital convertor (ADC) for converting the video signal into a digital signal, a serializer module for transforming the digital signal into a serial data signal, and a second connector for outputting the serial data signal.

According to a second aspect, the present disclosure provides a SFP unit comprising a first connector for receiving a serial data signal, a deserializer module for transforming the serial data signal into a digital signal, a digital to analog convertor (DAC) for converting the digital signal into a video signal, and a second connector for outputting the video signal.

According to a third aspect, the present disclosure provides a conversion device comprising a SFP unit. The SFP unit comprises a first connector for receiving a video signal, an ADC for converting the video signal into a digital signal, a serializer module for transforming the digital signal into a serial data signal, and a second connector for outputting the serial data signal.

According to a fourth aspect, the present disclosure provides a conversion device comprising a SFP unit. The SFP unit comprises a first connector for receiving a serial data signal, a deserializer module for transforming the serial data signal into a digital signal, a DAC for converting the digital signal into a video signal, and a second connector for outputting the video signal.

According to a fifth aspect, the present disclosure provides a conversion device comprising a SFP unit. The SFP unit comprises an ADC/DAC for converting a signal between an analog format and a digital parallel format, a serializer/deserializer module for transforming a digital signal between the digital parallel format and a serial format, a first connector for receiving and/or sending a video signal according to the analog format, and a second connector for receiving and/or sending a data signal according to the serial format.

According to a sixth aspect, the present disclosure provides a SFP unit comprising a first connector for receiving a first video signal according to a first format, a processor for converting the first video signal from the first format to a second format, and a second connector for outputting a second video signal according to the second format.

According to a seventh aspect, the present disclosure provides a SFP unit comprising a first connector for receiving an analog or digital video signal, a timing source, a processor for applying frame synchronization to frames of the video signal based on the timing source, and a second connector for outputting the video signal.

According to an eighth aspect, the present disclosure provides a device comprising a SFP unit. The SFP unit comprises a first connector for receiving a video signal, a processor for converting the received video signal, and a second connector for sending the converted video signal.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

DETAILED DESCRIPTION

Figure 1:
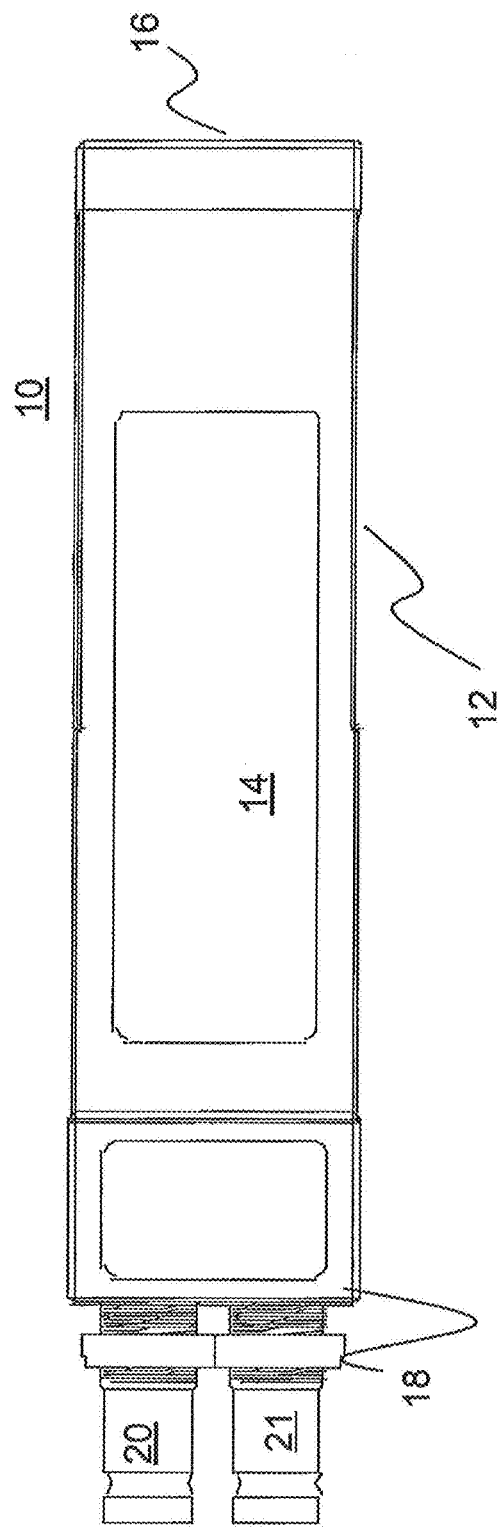
FIG. 1 is a top view of a SFP unit.
Figure 2:
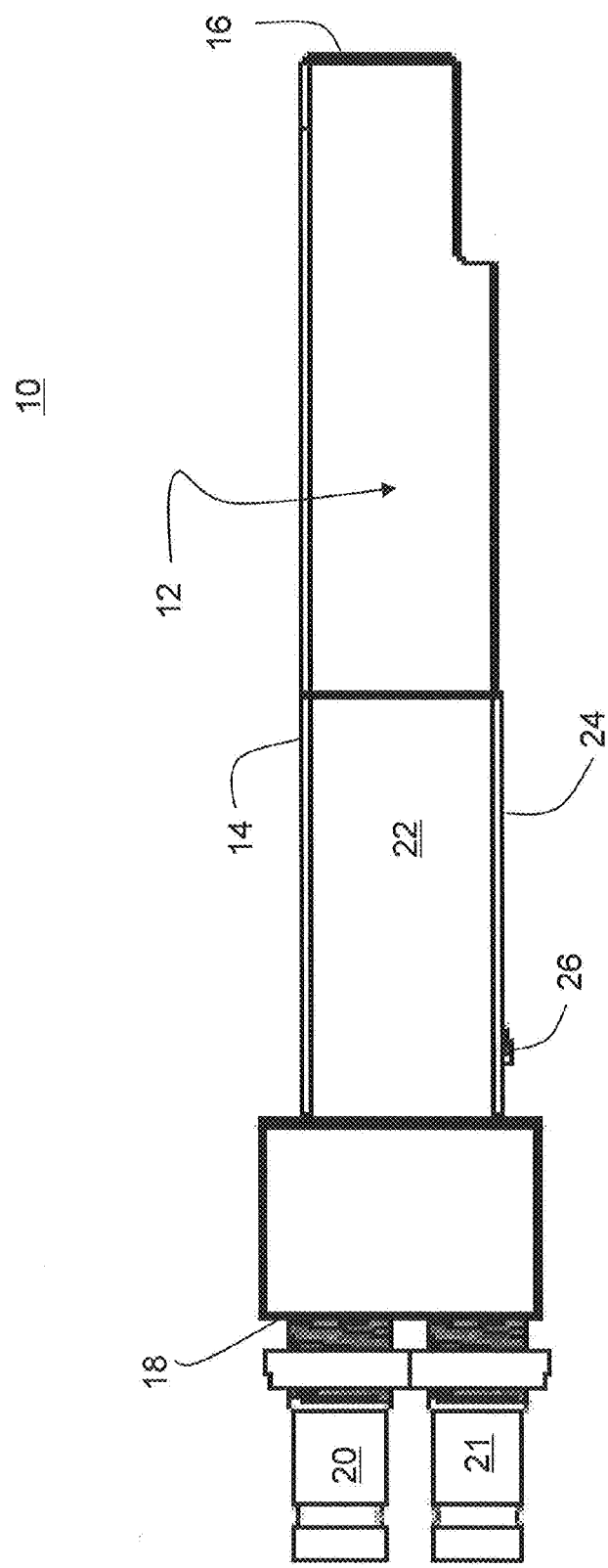
FIG. 2 is a side elevation view of the SFP unit of FIG. 1.
Figure 4:
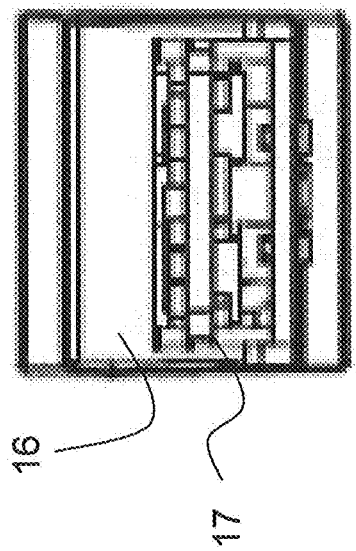
FIG. 4 is back elevation view of the SFP unit of FIG. 1.
Figure 3:
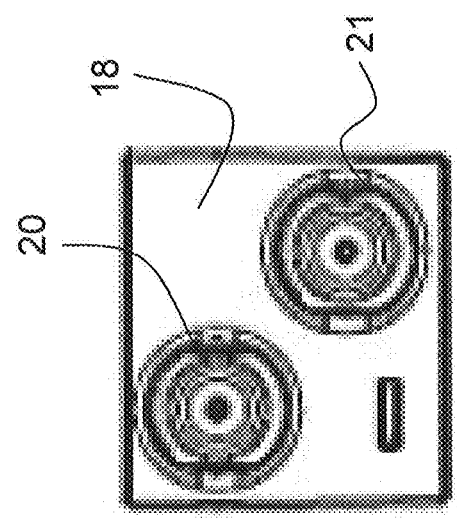
FIG. 3 is a front elevation view of the SFP unit of FIG. 1.
Figure 5:
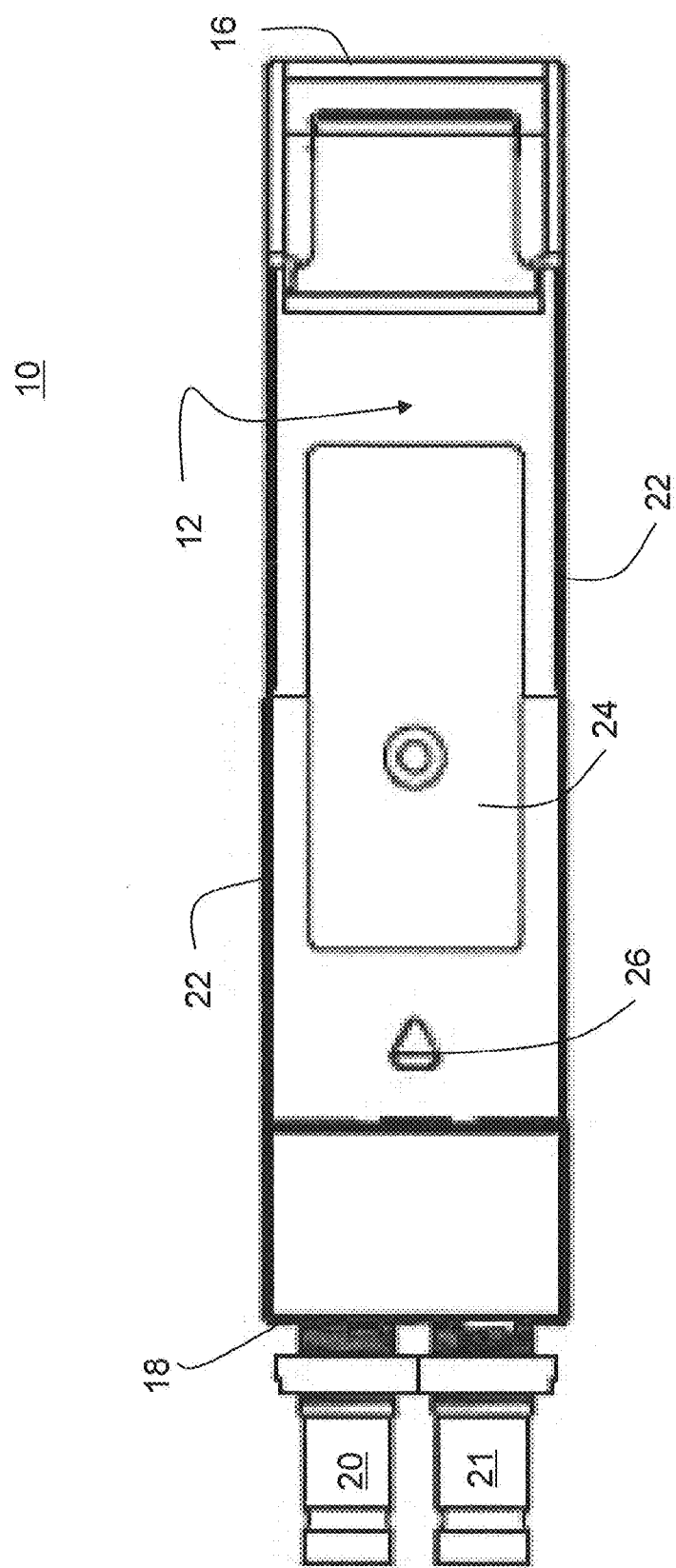
FIG. 5 is a bottom view of the SFP unit of FIG. 1.

The present disclosure introduces Small Form-factor Pluggable (SFP) units having internal features that far exceed those of conventional units. While conventional units merely provide connection capabilities between a host system in which they are inserted and external apparatuses, the SFP units disclosed herein provide conversion capabilities between analog video signals and serial data signals representative of the video signals. The SFP units may convert video signals between their analog format and their serial data format, in either or both directions, without the need to resort to any feature of a host system.

The following terminology is used throughout the present disclosure:

SFP Small Form factor Pluggable, this term refers to units that are insertable into a chassis of a hosting unit; in the present disclosure, a SFP unit complies with an industry standard specification.

ADC Analog to Digital Converter or Conversion of an electrical or optical signal.

DAC Digital to Analog Converter or Conversion of an electrical or optical signal.

Video signal Analog or digital signal usable for display purposes, either directly on a monitor, or through multicast or broadcast.

Serializer Module converting data from a parallel format to a serial format.

Deserializer Module converting data from a serial format to a parallel format.

Connector A device component for physically joining circuits carrying electrical, optical, radio-frequency, or like signals.

NTSC National Television System Committee specification for analog television broadcast used in North America and elsewhere.

PAL Phase Alternating Line specification for analog television broadcast used in Western Europe and elsewhere.

SECAM Séquentiel couleur à mémoire, French for "Sequential Color with Memory", specification for analog television broadcast used in France, Eastern Europe and elsewhere.

RGB Red Green Blue color model for video signals, used for example in computer displays; this includes both RGBS, in which horizontal and vertical synchronization are carried on a single (S) wire, and RGBHV, in which horizontal synchronization is carried on a (H) wire and vertical synchronization is carried on a (V) wire.

$YP_BP_R$ Color space encoding in which Y represents a brightness level, $P_B$ carries a difference between blue and the brightness level, and $P_R$ carries a difference between red and the brightness level.

Equalizer Processor for reducing intersymbol interference of an incoming signal.

Driver Amplifier for improving a strength of a signal at its source.

Cross conversion Conversion of a signal from a first format to a second format.

Frame synchronization Alignment of frames of an incoming video signal according to a timing reference.

The present disclosure relates to a device comprising a small form-factor pluggable (SFP) unit having signal conversion capabilities. The expression 'signal conversion' is used throughout the present disclosure and claims, and is meant to encompass conversion of signals between a first, analog or digital format and a second, analog or digital format, the signal conversion optionally including additional signal treatment.

The SFP unit comprises a housing having a front panel, a back panel, a top, a bottom and two sides, and may be fully-compliant or partially compliant with standardized SFP dimensions, such as SFP, XFP (10 Gigabit SFP), Xenpak, or any other standardized small form factor pluggable unit. Consequently, in the context of the present disclosure, a SFP Unit may correspond to SFP, SFP+, XFP or any other known standards related to small form factor pluggable units.

In the present description, the term "video signal" may designate signals compliant with various standards and specifications, including but not limited to a National Television System Committee (NTSC) signal, a Phase Alternating Line (PAL) signal, a Sequential Color with Memory (SECAM) signal, an analog signal of the Red Green Blue (RGB) format, a standard definition television (SDTV) format, an enhanced definition television (EDTV) format and a high definition television (HDTV) format.

Reference is now made concurrently to FIGS. 1-5, which are, respectively, a top view, a side elevation view, a front elevation view, a back elevation view and a bottom view of a SFP unit 10. The SFP unit 10 comprises a housing 12. The housing defines a top 14, a bottom 24, and two sides 22. The housing 12 may be at least partially of dimensions in compliance with the SFP, SFP+ and/or XFP specifications or having functional dimensions based on the SFP or SFP+ specifications.

The SFP unit 10 further comprises a back panel 16 affixed to the housing 12. The back panel 16 may comprise a rear interface 17, for example an electrical or an optical interface. In an example, the back panel comprises the rear interface 17 suitable to connect the SFP unit to a backplane of a chassis (not shown for clarity purposes), as known to those skilled in the art.

The SFP unit 10 further comprises a front panel 18 affixed to the housing 12. The front panel may comprise one or more connectors, for example a connector 20, of a co-axial cable type, adapted to send and/or receive an analog video signal and a connector 21, also of the co-axial cable type, adapted to send and/or receive a serial data signal. The SFP unit 10 may further comprise an engagement mechanism such as for example a latch 26 as shown in a resting position on the bottom 24, for maintaining the SFP unit 10 in place within a chassis.

Examples of connectors in the context of the present disclosure comprise all types of co-axial cable connectors, all types of optic fiber connectors, a Separate Video (S-Video) connector, a Composite Video, Blanking and Sync (CVBS) connector, a Radio Corporation of America (RCA) connector, a Bayonet Neill-Concelman (BNC) connector, a Video In Video Out (VIVO) connector, a $YP_BP_R$ connector, a mini Video Graphics Array (VGA) connector, a TV Aerial Plug, a mini-DIN (specified by the Deutsches Institut für Normung) connector, a Universal Serial Bus (USB) connector, a High-Definition Multimedia Interface (HDMI) connector, and a Serial Digital Interface (SDI) connector, wherein SDI connectors include variants known as SD-SDI, HD-SDI, ED-SDI, 3G-SDI, and the like. Some of these connector types are suitable for transmission of analog video signals, or serial data signals, or both, as is well-known to those of ordinary skill in the art. Consequently, in an embodiment, the connector 20 and the connector 21 may be of the same type.

Figure 6:
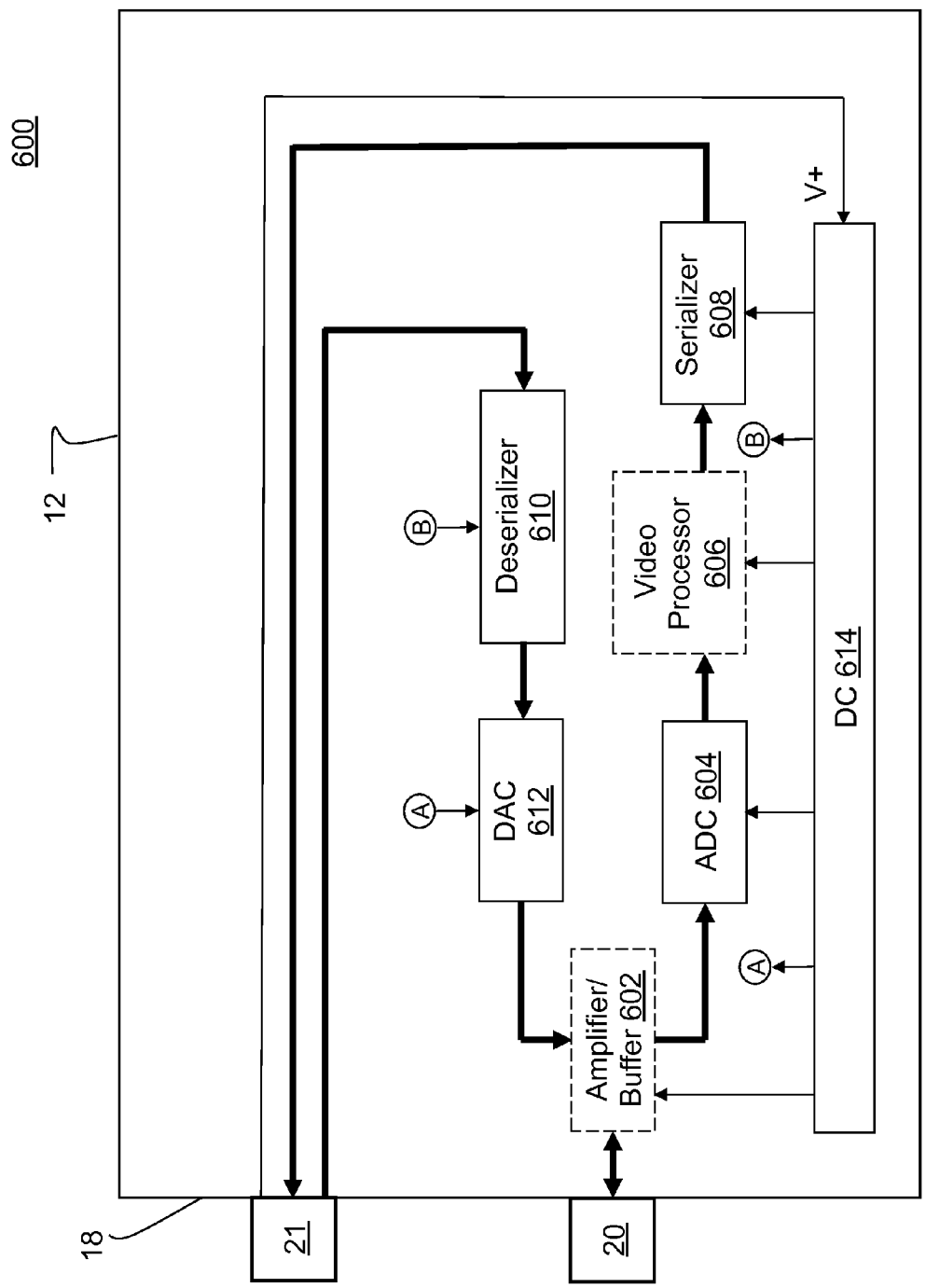
FIG. 6 is a simplified, exemplary block diagram of a SFP unit having signal conversion capabilities, according to, an embodiment.

Reference is now made to FIG. 6, which shows a simplified, exemplary block diagram of a SFP unit 600 having signal conversion capabilities, according to an embodiment. The SFP unit 600 forms a conversion device comprising the connector 20 and the connector 21 introduced in the foregoing description of FIGS. 1-5; other shown components of the SFP unit 600 are internal to the housing 12 shown on the preceding Figures.

As shown, the exemplary SFP unit 600 supports at once features for converting an analog video signal into a serial data signal and other features for converting a serial data signal into an analog video signal. Other embodiments may comprise the features for converting the analog video signal into the serial data signal, at the exclusion of the features for converting the serial data signal into the analog video signal. Yet other embodiments may comprise the features for converting the serial data signal into the analog video signal, at the exclusion of the features for converting the analog video signal into the serial data signal.

Components and features of the shown SFP unit 600 will now be described, first in relation to an analog to digital/serial conversion, and then in relation to a digital/serial to analog conversion. On FIG. 6, thicker arrows illustrate signal paths while thinner arrows illustrate power (voltage) distribution.

The connector 20 is for receiving a video signal in analog format. The video signal may be applied to an optional amplifier/buffer 602 for giving a gain to the video signal while also applying an input impedance that is compatible to a source of the video signal. The video signal is then applied to an analog to digital convertor (ADC) 604 for converting the video signal into a digital signal. The digital signal obtained from the ADC 604 may be represented as a suite of digital "words", in which each word comprises a number of parallel bits ranked from a most significant bit (MSB) to a least significant bit (LSB). In typical applications, 12-bit words may be used, although other formats are comprised within the scope of the present disclosure. The digital signal may optionally be processed by a video processor 606 for treating the digital signal. Treating the digital signal may comprise applying a correction to the digital signal. In various embodiments, treating the digital signal may comprise filtering, emphasizing, de-emphasizing, de-jittering or de-aliasing the digital signal. The digital signal is then converted, from its parallel format into a serial format, in a serializer module 608. Thereafter, the serial data signal is output on the connector 21.

In the opposite direction, the connector 21 is for receiving a serial data signal. The serial data signal is applied to a deserializer module 610. A resulting digital signal, comprising words in a parallel format, is then applied to a digital to analog converter (DAC) 612 for producing therefrom a video signal. The video signal may optionally be applied to the amplifier/buffer 602, giving the video signal some gain and providing an output impedance compatible with a receiver of the video signal. The video signal is then output on the connector 20.

An embodiment of the SFP unit 600 adapted for conversion of an analog video signal into a serial data signal may simply comprise the connectors 20 and 21, the ADC 604 and the serializer module 606. Another embodiment of the SFP unit 600 adapted for conversion of a serial data signal into an analog video signal may simply comprise the connectors 20 and 21, the deserializer module 610 and the DAC 612. Conversion devices capable of converting signals in a single direction are thus included within the scope of the present disclosure. FIG. 6 therefore illustrates a dual-capable conversion device while not intending to limit the present disclosure.

As is well-known to those of ordinary skill in the art, some connector types provide an input voltage in addition to analog or digital signal information. As a non-limiting example, the connector 21 may be a USB connector that provides an input voltage V+, having a nominal value of five (5) volts within a five (5) percent margin. The input voltage V+ is applied to a direct current (DC) power supply 614. The power supply 614 may be a simple array of conductors for directly providing the input voltage V+ to the various components 602-612 of the SFP unit 600. In some embodiments, the power supply 614 may include a voltage regulator for ensuring a stable voltage distribution to the components of the SFP unit 600. In other embodiments, the power supply 614 may comprise one or more DC-DC converters for converting the input voltage V+ into one or more voltage levels compatible with the characteristics of the various components of the SFP unit 600.

Other variations from the description of the SFP unit 600 as shown in FIG. 6 and as described hereinabove will readily come to those of ordinary skills in the art. For example, in an alternative embodiment, a SFP unit may comprise a single connector on its front panel 18. Features of one of the connectors 20 or 21 may then be implemented using the rear interface 17 shown on FIG. 4.

Figure 7:
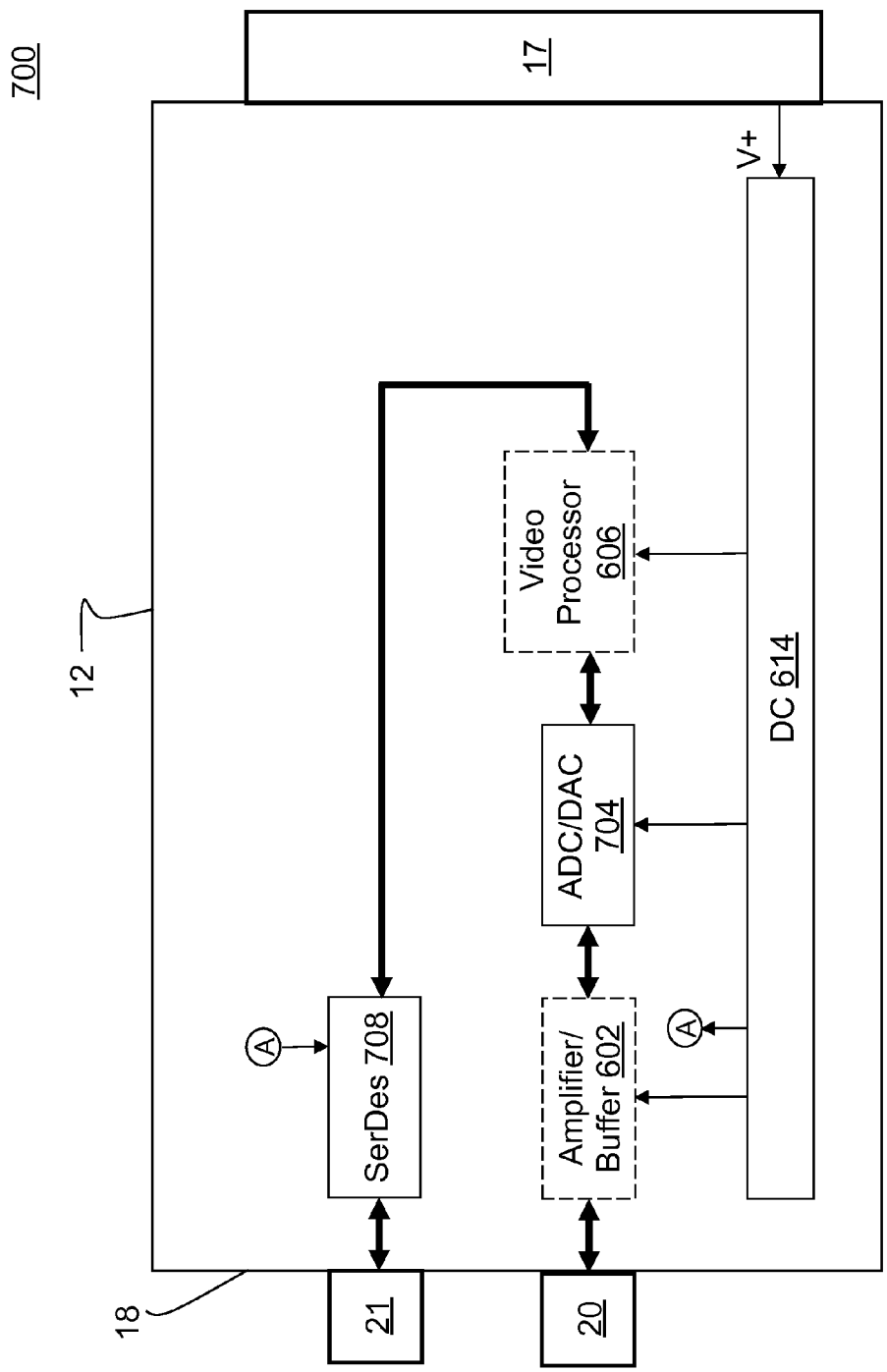
FIG. 7 is a simplified, exemplary block diagram of a SFP unit having signal conversion capabilities, according to another embodiment.

Reference is now made to FIG. 7, which shows a simplified, exemplary block diagram of a SFP unit 700 having signal conversion capabilities, according to another embodiment. The SFP unit 700 has dual conversion capabilities owing to the presence of a dual-purpose ADC/DAC 704 and of a combined serializer/deserializer module 708, commonly known as a "SerDes". The SFP unit 700 may also comprise an amplifier/buffer 602 and a video processor 606. An input voltage V+ is received into the SFP unit 700 via the rear interface 17 shown on FIG. 4. The input voltage V+ is applied to a DC power supply 614 that in turn provides the same or a modified input voltage to the amplifier/buffer 602, to the ADC/DAC 704, to the video processor 606 and to the SerDes module 708.

A video signal may be received at the connector 20, in analog format. The video signal may be applied to the optional amplifier/buffer 602. The video signal is then applied to ADC/DAC 704 for converting the video signal into a digital signal. The digital signal may optionally be processed by the video processor 606 for treating the digital signal. Treating the digital signal may comprise applying a correction to the digital signal, for example by filtering, emphasizing, de-emphasizing, de-jittering or de-aliasing the digital signal. The digital signal is then converted into a serial format in the SerDes module 708. Thereafter, the serial data signal is output on the connector 21.

Because the SFP unit 700 has dual conversion capabilities, the connector 21 may, in the opposite direction, receive a serial data signal. The serial data signal is applied to the SerDes module 708. A resulting digital signal then bypasses the video processor 606 and is applied to the ADC/DAC 704 for producing therefrom a video signal. The video signal may optionally be applied to the amplifier/buffer 602. The video signal is then output on the connector 20.

Bypassing the video processor 606 may comprise passing the digital signal through a path that does not include the video processor 606 or passing the signal through the video processor 660 in a transparent fashion.

While FIG. 6 shows an input voltage supplied by the connector 21, FIG. 7 shows an alternative embodiment in which an input voltage may be supplied by the rear interface 17. Those of ordinary skill in the art will readily appreciate that these arrangements are exemplary and are not intended to limit the present disclosure. Of course, either of the embodiments of FIGS. 6 and 7, and obvious variations thereof, may comprise an input voltage supplied from connectors 20 or 21, from the rear interface 17, or from other sources. For example, in another alternative embodiment, the connector 20 may provide a first input voltage for use in the ADC 604, in the DAC 612 and/or in the ADC/DAC 704 while the connector 21 may provide a second input voltage for use in the serializer 608, in the deserializer 610 and/or in the SerDes 708. Additionally, while a single voltage line is shown from either of the connector 21 or from the rear interface 17, leading to the DC power supply 6.14, other arrangements may comprise a plurality of lines for providing a stable voltage ground, one or more levels or positive voltages and/or one or more levels of negative voltages.

FIGS. 8-12 show variations of SFP units according to additional aspects of the present disclosure. Some details of the preceding figures are not repeated hereinbelow for clarity purposes. In all of the following figures, connectors may comprise a co-axial cable connector, an optic fiber connector, a S-Video connector, a CVBS connector, a RCA connector, a BNC connector, a VIVO connector, a $YP_BP_R$ connector, a mini VGA connector, a TV Aerial Plug, a mini-DIN connector, a USB connector, a HDMI connector, and a SDI connector. Also, in any one of FIGS. 8-12, DC power distribution may be made according to the various means described in relation to FIGS. 6 and 7.

Figure 8:
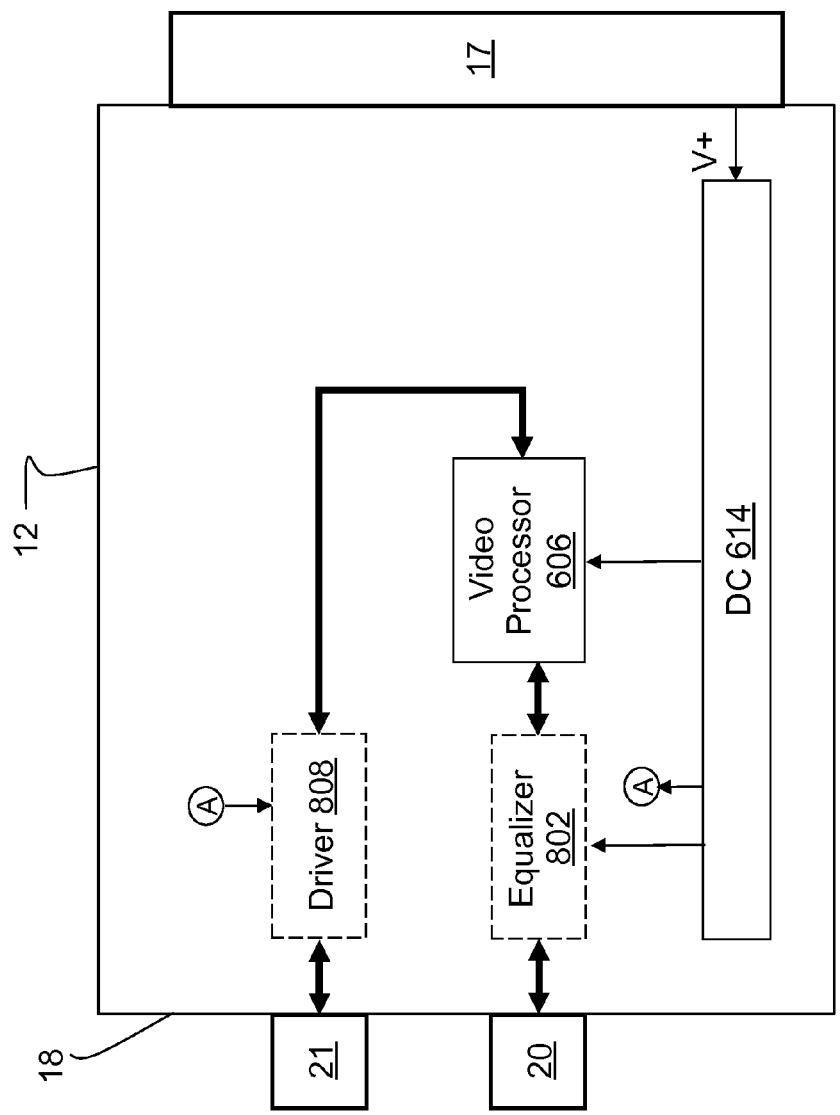
FIG. 8 is a simplified, exemplary block diagram of a SFP unit having cross conversion capabilities, according to an embodiment.

FIG. 8 is a simplified, exemplary block diagram of a SFP unit 800 having cross conversion capabilities, according to an embodiment. The SFP unit 800 comprises a video processor 606, which may be a different unit from the processors of the preceding figures, or which may alternatively be a similar multi-purpose processor programmed differently from those of the preceding figures. The SFP unit 800 may optionally comprise one or more additional components, including for example an equalizer 802 and a cable driver 808. A video signal may be received at the connector 20. The received video signal may be equalized by the equalizer 802. The video processor 606 then converts the video signal from a first format, as it was received at the connector 20, to a second format. The video signal may be given a gain by the cable driver 802 prior to outputting at the connector 21.

Figure 9:
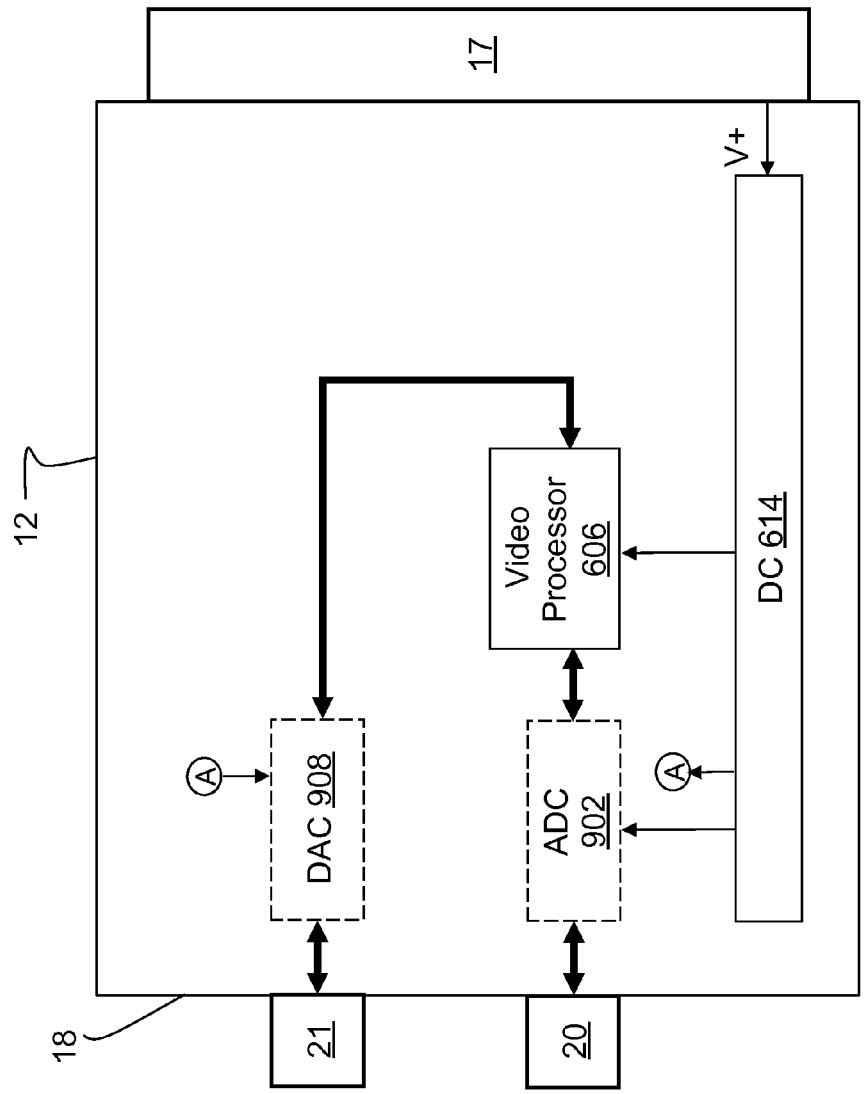
FIG. 9 is a simplified, exemplary block diagram of a SFP unit having cross conversion capabilities, according to another embodiment.

FIG. 9 is a simplified, exemplary block diagram of a SFP unit 900 having cross conversion capabilities, according to another embodiment. Comparing FIGS. 8 and 9, FIG. 9 further comprises an optional ADC 902 and an optional DAC 908 for converting a received video signal from an analog format to a digital format, before conversion of the video signal from a first format to a second format in the video processor 606, and for converting the resulting video signal to an analog format before outputting at the connector 21.

In the embodiments of FIGS. 8 and 9, conversion between the first and second formats may comprise converting from any one to any other one of the NTSC format, the PAL format, the SECAM format and the RGB format. For digital video signals, conversion between the first and second formats may comprise converting from any one to any other one of the SDTV format, the EDTV format and the HDTV format, using up-conversion or down-conversion. A further embodiment may comprise only one of the ADC 902 or DAC 908, and conversion may comprise at least in part conversion from any analog video format to any digital video format or from any digital video format to any analog video format. Of course, some other embodiments may comprise various combinations of the ADC 902, the DAC 908, the equalizer 802 and/or the cable driver 808 included in a same SFP unit.

Figure 10:
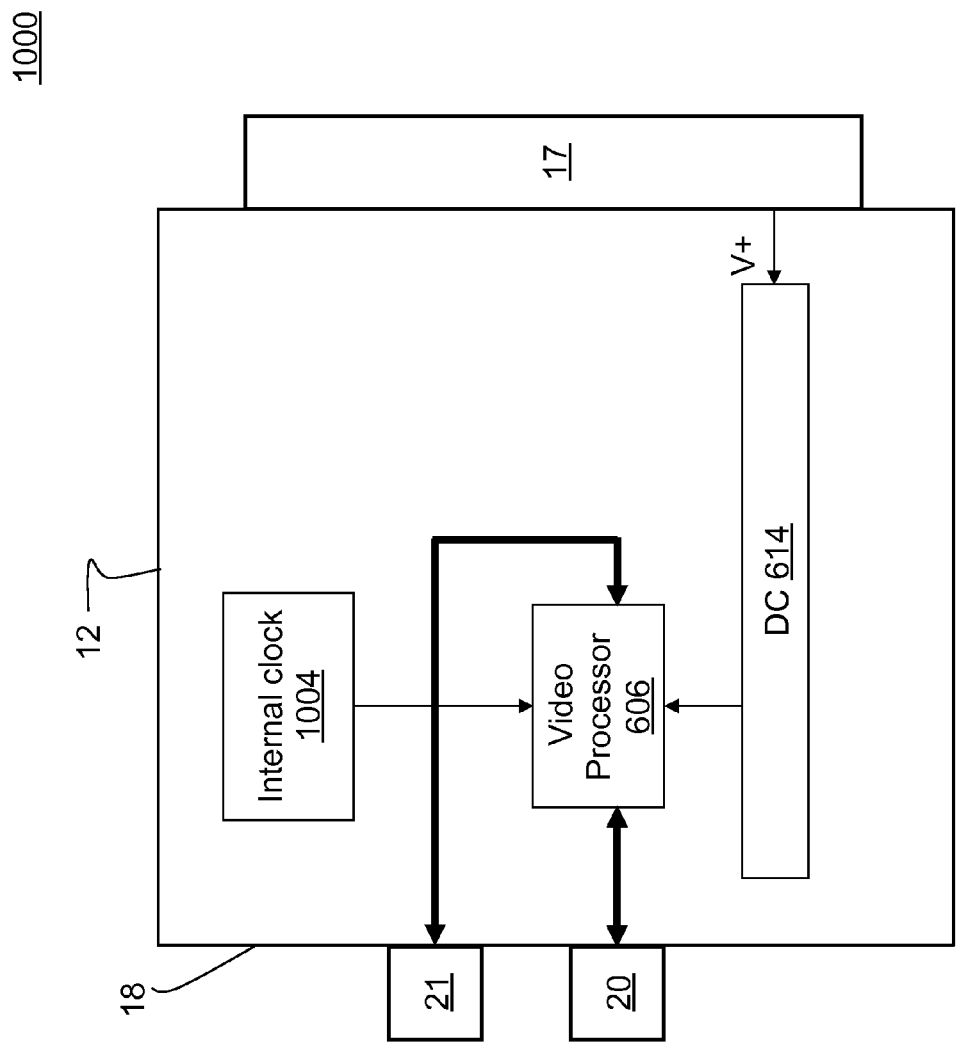
FIG. 10 is a simplified, exemplary block diagram of a SFP unit having synchronization capabilities, according to an embodiment.
Figure 11:
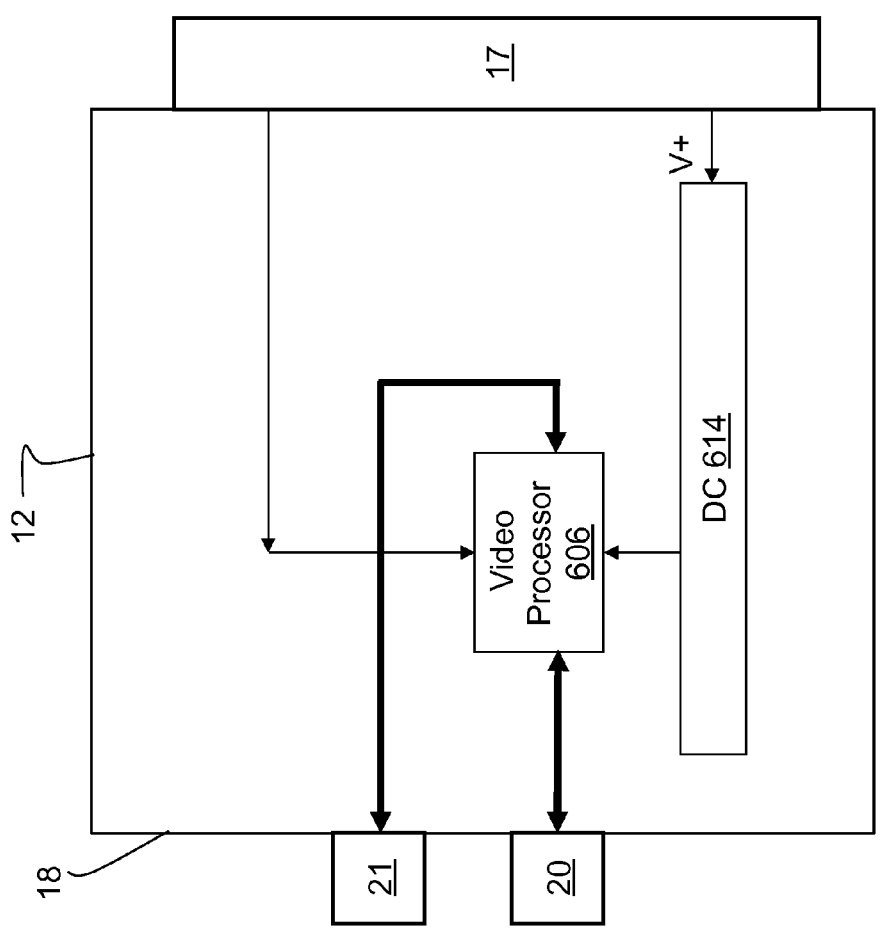
FIG. 11 is a simplified, exemplary block diagram of a SFP unit having synchronization capabilities, according to another embodiment.
Figure 12:
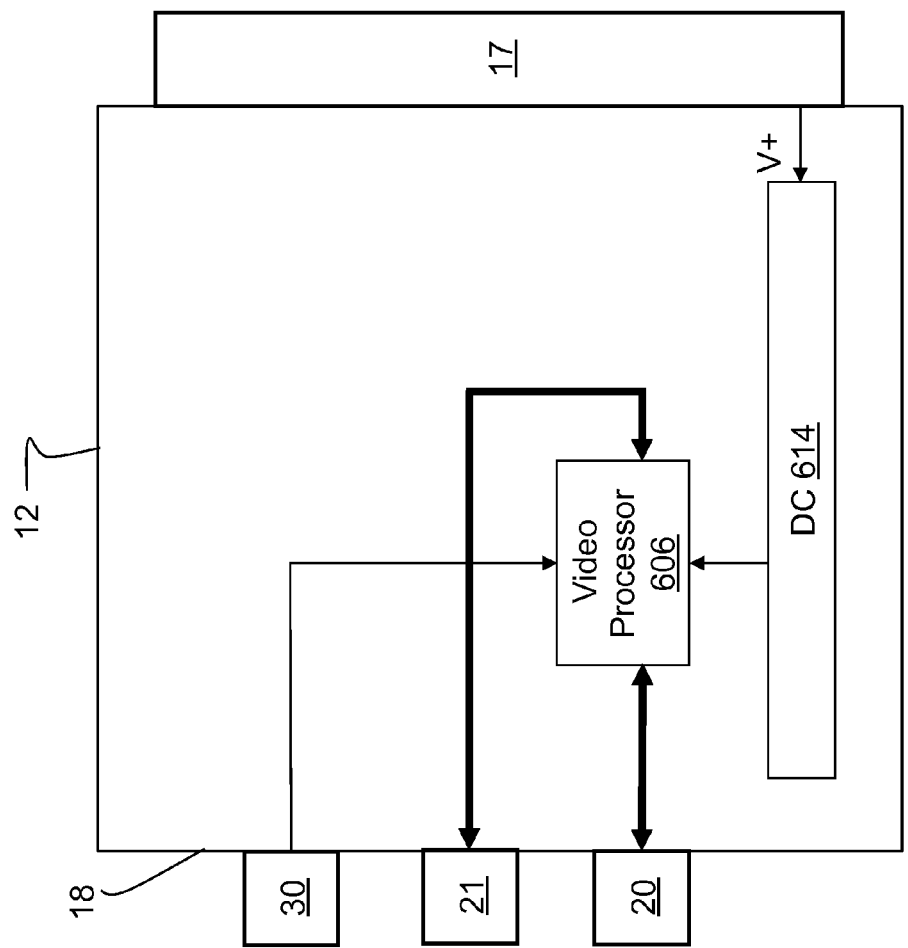
FIG. 12 is a simplified, exemplary block diagram of a SFP unit having synchronization capabilities, according to a further embodiment.

FIG. 10 is a simplified, exemplary block diagram of a SFP unit 1000 having synchronization capabilities, according to an embodiment. FIG. 11 is a simplified, exemplary block diagram of a SFP unit 1100 having synchronization capabilities, according to another embodiment. FIG. 12 is a simplified, exemplary block diagram of a SFP unit 1200 having synchronization capabilities, according to a further embodiment. Referring at once to FIGS. 10, 11 and 12, a video signal may be received at the connector 20. The video processor 606 then uses a timing source to apply frame synchronization to frames of the video signal. The video signal may then be output at the connector 21. Though not specifically shown on FIGS. 10-12, the SFP units 1000, 1100 and/or 1200 may further comprise an ADC connected to the first connector. When the received video signal is an analog video signal, the ADC converts the analog video signal to a digital video signal before application of frame synchronization by the processor 606.

In the embodiment of FIG. 10, the timing source is an internal clock 1004 internal to the SFP unit 1000. On FIG. 11, the timing source is obtained from a chassis in which the SFP unit 1100 is inserted, via the rear interface 17. In the embodiment of FIG. 12, the timing source is obtained from an additional connector 30, which may be for example mounted on the front panel 18 of the SFP unit 1200.

Those of ordinary skill in the art will realize that the description of the SFP units and conversion devices are illustrative only and are not intended to be in any way limiting. Other embodiments will readily suggest themselves to such persons with ordinary skill in the art having the benefit of the present disclosure. It will, for example, be possible to construct, based on the teachings of the present disclosure, a device comprising a SFP unit capable of receiving an NTSC video signal, converting the video signal to a digital format, applying frame synchronization to the digital video signal, up-converting the digital video signal to the EDTV format, and then serializing the resulting digital signal prior to output thereof. Other combinations will come to mind to those of ordinary skills in the art. The disclosed SFP units and conversion devices may be customized to offer valuable solutions to existing needs and, problems of signal conversion.

In the interest of clarity, not all of the routine features of the implementations of the SFP units and of the conversion devices are shown and described. It will, of course, be appreciated that in the development of any such actual implementation of the SFP units or conversion devices, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of signal conversion having the benefit of the present disclosure.

In accordance with the present disclosure, the components, described herein may be implemented using various types of hardwired devices, field programmable gate arrays (FPGAs), application specific integrated circuits (ASICs), or the like.

Systems and modules described herein may comprise software, firmware, hardware, or any combination(s) of software, firmware, or hardware suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A small form-factor pluggable (SFP) unit comprising:
   a housing having specific standardized SFP dimensions and adapted to being inserted into a chassis of a hosting unit;
   a first bidirectional connector on a front panel of the housing for receiving a video signal;
   an analog to digital convertor (ADC) in the housing for converting the video signal into a digital signal;
   a serializer module in the housing for transforming the digital signal into a serial data signal; and
   a second bidirectional connector on the front panel of the housing for outputting the serial data signal.

2. The SFP unit of claim 1, wherein the video signal is one of the following: a National Television System Committee (NTSC) signal, a Phase Alternating Line (PAL) signal, a Sequential Color with Memory (SECAM) signal, and an analog signal of a Red Green Blue (RGB) format.

3. The SFP unit of claim 1, comprising a processor for treating the digital signal before serializing.

4. The SFP unit of claim 3, wherein treating the digital signal comprises an element selected from the group consisting of filtering, emphasizing, de-emphasizing, de-jittering and de-aliasing the digital signal.

5. The SFP unit of claim 1, wherein the first bidirectional connector is one of the following: a co-axial cable connector, a optic fiber connector, a Separate Video (S-Video) connector, a composite video, blanking and sync (CVBS) connector, a Radio Corporation of America (RCA) connector, a Bayonet Neill-Concelman (BNC) connector, a Video In Video Out (VIVO) connector, a $YP_BP_R$ connector, a mini Video Graphics Array (VGA) connector, a TV Aerial Plug, and a mini-DIN (Deutsches Institut für Normung) connector.

6. The SFP unit of claim 1, wherein the second bidirectional connector is one of the following: a co-axial cable connector, a optic fiber connector, a Universal Serial Bus (USB) connector, a Serial Digital Interface (SDI) connector, a BNC connector, a mini VGA connector, a High-Definition Multimedia Interface (HDMI) connector, and a mini-DIN connector.

7. A small form-factor pluggable (SFP) unit comprising:
   a housing having specific standardized SFP dimensions and adapted to being inserted into a chassis of a hosting unit;
   a first bidirectional connector on a front panel of the housing for receiving a serial data signal;
   a deserializer module in the housing for transforming the serial data signal into a digital signal;
   a digital to analog convertor (DAC) in the housing for converting the digital signal into a video signal; and
   a second bidirectional connector on the front panel of the housing for outputting the video signal.

8. The SFP unit of claim 7, wherein the video signal is one of the following: a National Television System Committee (NTSC) signal, a Phase Alternating Line (PAL) signal, a Sequential Color with Memory (SECAM) signal, and an analog signal of a Red Green Blue (RGB) format.

9. A conversion device comprising:
   a small form-factor pluggable (SFP) unit comprising:
      a housing having specific standardized SFP dimensions and adapted to being inserted into a chassis of a hosting unit;
      an analog to digital convertor and digital to analog convertor (ADC/DAC) in the housing for converting a signal between an analog format and a digital parallel format,
      a serializer and deserializer module in the housing for transforming a digital signal between the digital parallel format and a serial format,
      a first bidirectional connector on a front panel of the housing for receiving a video signal according to the analog format, and
      a second bidirectional connector on the front panel of the housing for sending a data signal according to the serial format.

10. The conversion device of claim 9, wherein the serializer and deserializer module comprises separate modules for transforming the digital signal from the digital parallel format to the serial format and for transforming the digital signal from the serial format to the digital parallel format.

11. The conversion device of claim 9, wherein the serializer and deserializer module is formed of a dual-purpose module.

12. The SFP unit of claim 1, wherein the video signal is one of a standard definition television (SDTV), enhanced definition television (EDTV) and high definition television (HDTV), and the second format is another one of SDTV, EDTV and HDTV.

13. The SFP unit of claim 3, further comprising;
   a timing source in the housing; and
   wherein the processor applies frame synchronization to frames of the video signal based on the timing source.

14. The SFP unit of claim 13 wherein the timing source comprises an internal clock.

15. The SFP unit of claim 13, wherein the timing source comprises a third connector for connecting the SFP unit to a timing reference of the chassis.

16. The SFP unit of claim 13, wherein the timing source comprises a third connector for connecting the SFP unit to an external timing reference.

* * * * *